Jan. 10, 1950
W. WEBER
2,494,021
AUTOMATIC EXTRACTOR AND LOADER
Filed Oct. 11, 1948
2 Sheets-Sheet 1
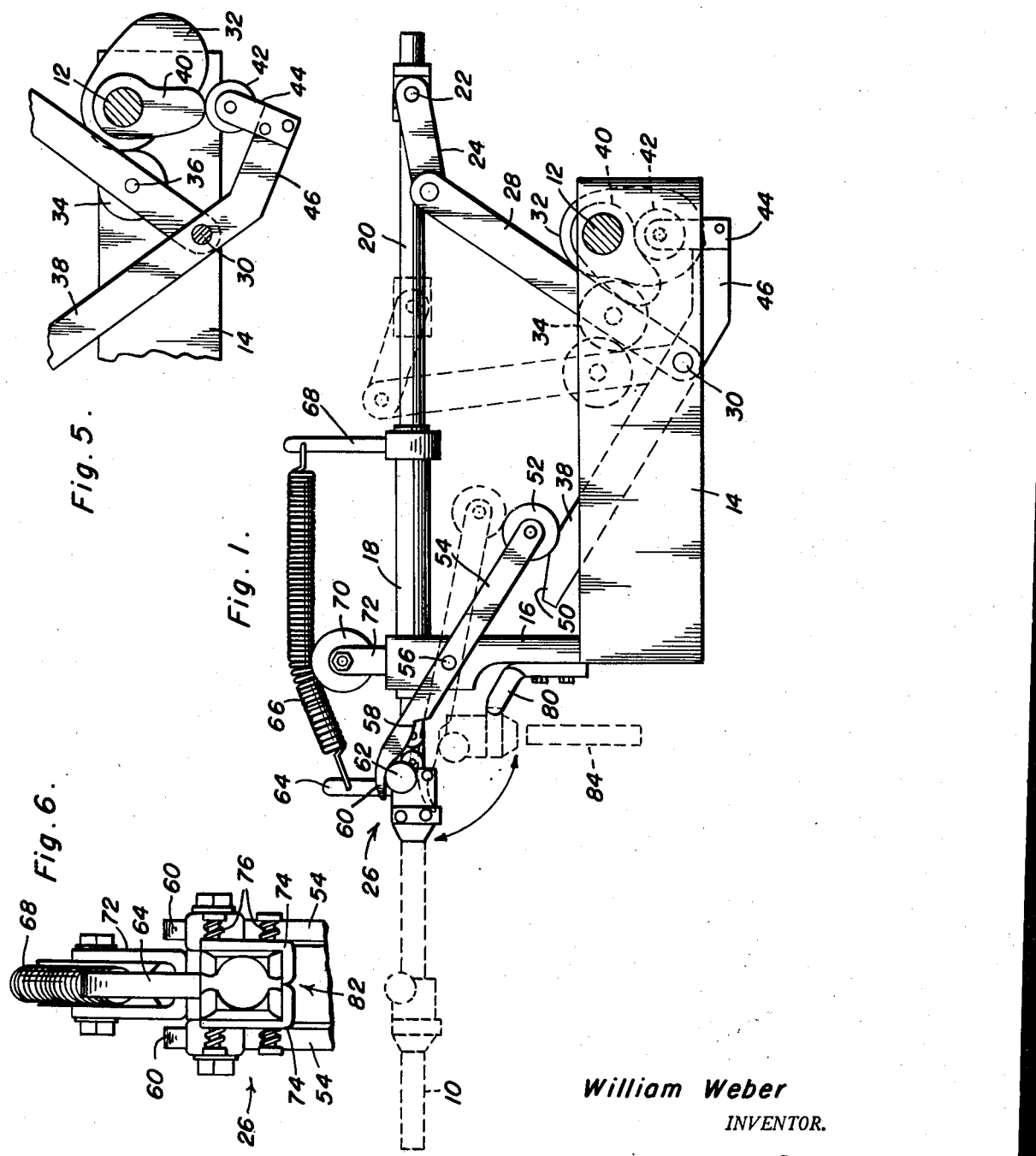
William Weber
INVENTOR.

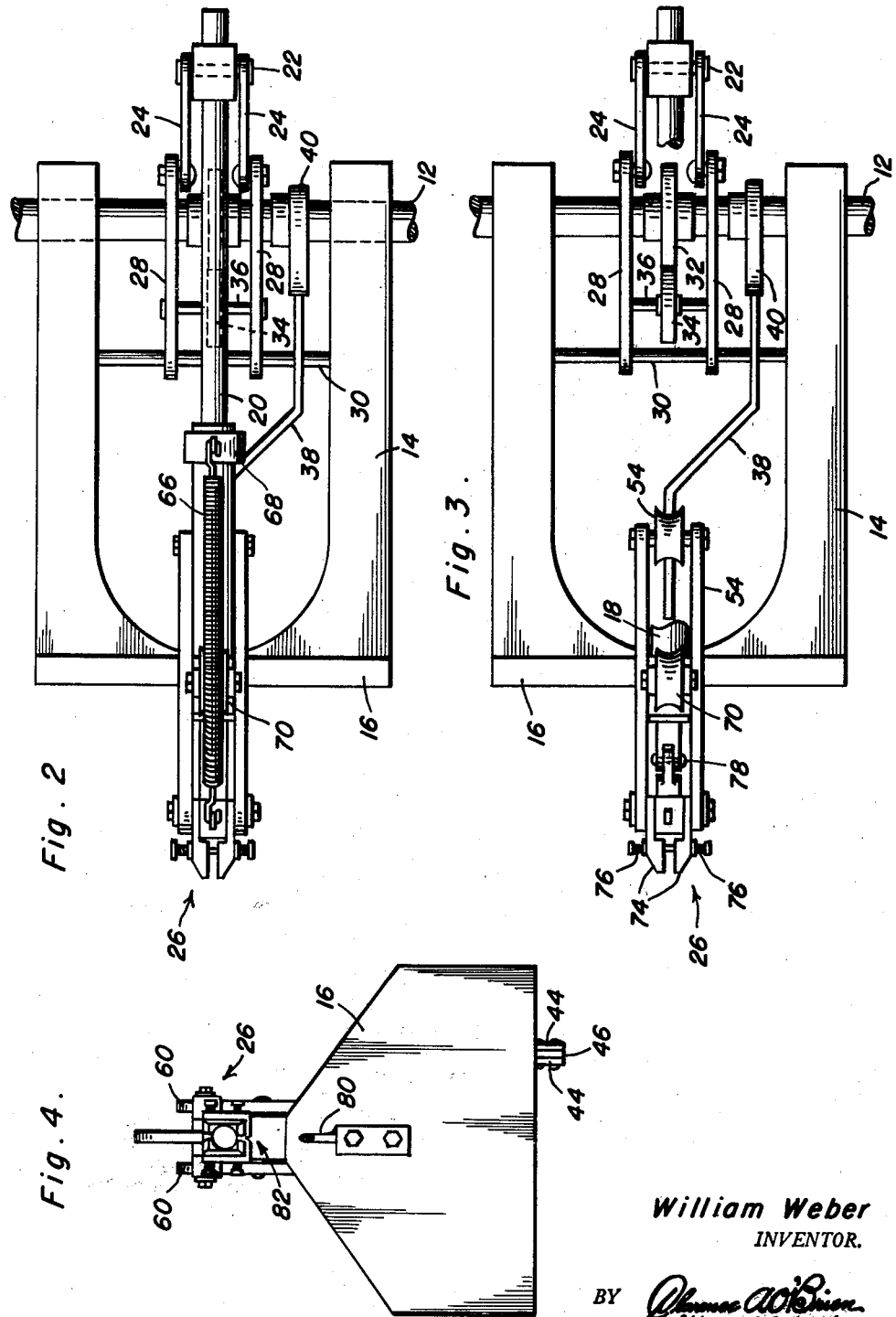

Patented Jan. 10, 1950

2,494,021

UNITED STATES PATENT OFFICE 2,494,021

AUTOMATIC EXTRACTOR AND LOADER

William Weber, Fairview, N. J.

Application October 11, 1948, Serial No. 53,932

4 Claims. (Cl. 214—1)

This invention relates generally to material handling apparatus and is especially designed for handling elongated cylindrical bodies which are to be translated and turned through an angle.

The primary object of this invention is to provide means for handling material, especially where conveyors are utilized, and where the material, thought of as being cylindrical parts or the like, is to be translated a short distance and turned through an angle of 90 degrees, although the invention is not limited to an embodiment thereof which moves the material in this precise manner.

Another object of this invention is to provide a material handling machine in which the material grasping head assembly is easily removable and replaceable, so that different sizes and shapes of material can be handled.

Another object of this invention, of a specific nature, is to provide a material handling device suitable for translating and rotating certain tubular articles in the coating and printing processes, especially the shifting of articles from a rack to a conveyor.

And a last object to be mentioned specifically is to provide a material handling machine which is relatively inexpensive and practicable to manufacture, which is safe, simple and positive in operation, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the assembled machine;

Figure 2 is a top plan view of the structure shown in Figure 1;

Figure 3 is another top plan view, with a spring and what is hereinafter referred to as the reciprocating bar, as well as a portion of the sleeve bearing for this reciprocating bar, removed in order to show the underlying parts more clearly;

Figure 4 is a front end elevational view of the assembled machine;

Figure 5 is an enlarged fragmentary detail view; vertical sectional in character, showing the detail construction of the cams used to operate the parts hereinafter referred to as the lever and one of the rocker arms; and Figure 6 is an enlarged front end elevational view of the upper portion of the machine.

Similar characters of reference designate similar or identical elements and portions throughout the specification and throughout the different views in the drawings.

Referring now to the drawings in detail, the environment wherewith this invention is adapted to be used will include the material to be handled, represented at 10 in dash line in Figure 1, and power means, not shown, to rotate the drive shaft 12.

The drive shaft 12 is journaled in the arms of a U-shaped frame 14 and will ordinarily be horizontal. The frame has an upstanding pillar 16 which may be of heavy plate type and which has rigidly secured thereto the forward end of a sleeve bearing 18 in which is operatively mounted a reciprocating bar 20 which extends in both directions beyond the ends of the sleeve bearing 18, one end having pivoted thereto at 22 a pair of inflexible links 24, while the forward end of the reciprocating bar 20 has pivotally secured thereto the material grasping head assembly 26.

The inflexible links 24 are pivoted to a pair of levers 28 which are, in turn, pivoted on a cross bar 30 on the frame 14. The drive shaft 12 has a cam 32 which will be referred to hereinafter as the first cam or large cam, and this first cam coacts with a roller 34 carried on a cross bar 36 terminally secured to the levers 28.

A rocker arm 38 is also pivoted upon the cross bar 30 and is operated by what will be hereinafter referred to as the second cam or small cam 40 which is also rigidly secured to the drive shaft 12. The second cam 40 coacts with a roller 42 carried on an extension 44 on the rearwardly extending portion 46 on the rocker arm 38. The forward end of the rocker arm 38 is provided with a cam surface 50 which coacts with a roller 52 on the end of a second rocker arm 54 which is pivoted at 56 on the pillar 16.

Another cam face 58 is provided on the forwardly extending portion 60 of the second rocker arm 54 and this cam face 58 coacts with a trunnion member 62 on the head 26. The head is also provided with an upstanding short lever 64 to which is secured a spring 66 under tension between this lever 64 and an upstanding arm 68 rigidly mounted upon the rear end of the sleeve bearing 18. A roller 70 is mounted upon a bifurcated bracket 72 secured to the top end of the pillar 16 and supports the spring 66 at a point intermediate its ends.

The material grasping jaws 74 on the head 26 are biased toward each other by springs 76 associated with transverse bars, all according to conventional practice, and upon the forward shifting of the reciprocating bar 20 and the head 26 the material grasping jaws 74 are made to engage the material represented at 10 in a manner which need not be fully set forth in this specification. The head 26 is pivoted as at 78 on the forward end of the reciprocating bar 20.

A wedge shaped member 80 is rigidly secured to the pillar 16 at a level lower than the sleeve bearing 18 and on the front side thereof. When the head 26 is moved into a second position indicated in dash line in Figure 1, the wedge shaped member 80 is forced between the angulated inner edge portion of the jaws 74, as clearly indicated at 82 in Figures 4 and 6, forcing these jaws apart against the action of the springs 76 and releasing the material 10 to drop under the force of gravity into the position indicated at 84 in Figure 1.

The operation of this invention will be clearly understood from a consideration of the foregoing description of the mechanical details thereof, taken in connection with the drawings and with the above recited objects sought to be achieved by this invention. In recapitulation, it may be noted that the first cam 32 will cause the levers 28 and links 24 to move the reciprocating bar 20 so that the head 26 is shifted reciprocatively in a horizontal direction. The head 26 is pivoted, as at 78 on the forward end of the reciprocating bar 20 and the second or smaller cam 40 subsequently forces the rocker arm means represented by the rocker arms 38 and 54 to move so that the trunnion 62 and the head 26 are rotated downwardly through an angle of approximately 90 degrees until the wedge shaped member 80 engages the material grasping jaws 74. It will also be clearly understood how the material 10 is grasped on the forward motion of the reciprocating bar 20 and how the material is released, as indicated at 84, after being translated rearwardly, or to the right in Figure 1. It will be clear how this machine is ideally adapted for moving material from a rack onto a conveyor, while the machine may be used for many other similar or analogous purposes.

Minor variations from the embodiment illustrated in the drawings and described above may be resorted to without departure from the spirit of this invention, and the scope of this invention should be determined only in accordance with a proper interpretation of the terms used in the subjoined claims.

Having described the invention, what is claimed as new is:

1. Material handling apparatus comprising a fixed frame, a driven shaft journaled on said frame, a sleeve bearing, a reciprocating bar mounted in said bearing and extending from each end thereof, a lever pivoted on said frame adjacent said shaft, a first cam on said shaft to rock said lever, an inflexible link pivoted to said lever and to one end of said reciprocating bar, rocker arm means pivoted on said frame, a second cam circumferentially spaced from the first cam on said shaft to operate said rocker arm means, a head having spring biased material grasping jaws pivoted on the other end of said reciprocating bar, said rocker arm means engaging said head to pivot the head from a first position to a second position when said second cam engages said rocker arm means, jaw spreading means to open said jaws when the head is pivoted into a second position, and means to bias said head into said first position and to bias the reciprocating bar in one direction.

2. An apparatus according to claim 1 and wherein said rocker arm means comprises a pair of coacting rocker arms, one of which is pivoted adjacent said head.

3. An apparatus according to claim 1 and wherein said jaw spreading means is a fixed wedge on said frame positioned to enter between said jaws.

4. An apparatus according to claim 1 and wherein said means to bias comprises a lever on said head, and a spring connected under tension between said lever and said sleeve bearing.

WILLIAM WEBER.

No references cited.